United States Patent
Coskun et al.

(10) Patent No.: US 10,457,035 B2
(45) Date of Patent: Oct. 29, 2019

(54) APPARATUSES AND SYSTEMS FOR NET SHAPE MANUFACTURING

(71) Applicant: General Electric Company, Schenectady, NY (US)

(72) Inventors: Kemal Mehmet Coskun, Istanbul (TR); Robert Trent Hullender, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 15/451,872

(22) Filed: Mar. 7, 2017

(65) Prior Publication Data
US 2018/0257168 A1  Sep. 13, 2018

(51) Int. Cl.
*B23K 26/146* (2014.01)
*B23K 26/342* (2014.01)
*B33Y 30/00* (2015.01)
*B23K 26/14* (2014.01)
*B33Y 10/00* (2015.01)

(52) U.S. Cl.
CPC .......... *B33Y 30/00* (2014.12); *B23K 26/1462* (2015.10); *B23K 26/342* (2015.10); *B33Y 10/00* (2014.12)

(58) Field of Classification Search
CPC ...... B23K 15/00–10; B23K 26/00–707; B23K 26/1464; B23K 26/342; B33Y 30/00; B33Y 10/00
USPC ................ 219/121.12–121.35, 121.6–121.86
See application file for complete search history.

(56) References Cited

U.S. PATENT DOCUMENTS

| | | | | |
|---|---|---|---|---|
| 5,837,960 A | * | 11/1998 | Lewis | B23K 26/34 219/121.63 |
| 6,172,327 B1 | * | 1/2001 | Aleshin | B23K 26/032 219/121.64 |
| 7,358,457 B2 | * | 4/2008 | Peng | B23K 26/1476 219/121.63 |
| 8,076,607 B2 | | 12/2011 | Lentz | |
| 8,119,950 B2 | | 2/2012 | Stiles et al. | |

(Continued)

FOREIGN PATENT DOCUMENTS

| | | | |
|---|---|---|---|
| EP | 2314411 A2 | 4/2011 | |
| EP | 2463052 A1 * | 6/2012 | ........... B23K 26/147 |

(Continued)

OTHER PUBLICATIONS

Extended European Search Report and Opinion issued in connection with corresponding EP Application No. 18159721.2 dated Aug. 8, 2018.

*Primary Examiner* — Samuel M Heinrich
(74) *Attorney, Agent, or Firm* — Armstrong Teasdale LLP

(57) ABSTRACT

Described is a nozzle assembly that includes a body component defining a center axis. The nozzle assembly also includes an energy beam channel and substantially collinear with the center axis. The energy beam channel has an inlet portion and an outlet portion oriented to pass an energy beam therethrough. At least one side-feeding powder tube extends through the body component at an angle with respect to the center axis. The side-feeding powder tube discharges a powdered material into a focus point of the energy beam. The angle is selected to generate a powder concentration spot diameter that is about twice a beam focus point diameter of the energy beam focus point.

20 Claims, 3 Drawing Sheets

(56) References Cited

U.S. PATENT DOCUMENTS

| | | |
|---|---|---|
| 8,505,414 B2 | 8/2013 | Culf |
| 9,126,286 B2 | 9/2015 | Bartels et al. |
| 9,315,903 B2 | 4/2016 | Bruck et al. |
| 2005/0056628 A1* | 3/2005 | Hu .................. B23K 26/144 219/121.84 |
| 2011/0168090 A1 | 7/2011 | Clark et al. |
| 2012/0199564 A1 | 8/2012 | Washko, Jr. et al. |
| 2015/0196975 A1 | 7/2015 | Sato et al. |
| 2015/0217414 A1 | 8/2015 | Luick et al. |
| 2016/0023306 A1 | 1/2016 | Arjakine et al. |

FOREIGN PATENT DOCUMENTS

| | | |
|---|---|---|
| EP | 3085518 A1 | 10/2016 |
| WO | 9300171 A1 | 1/1993 |
| WO | 2011082582 A1 | 7/2011 |

* cited by examiner

APPARATUSES AND SYSTEMS FOR NET SHAPE MANUFACTURING

BACKGROUND

The present disclosure relates generally to net shape manufacturing systems and, more specifically, to apparatuses and systems for powdered material delivery in net shape manufacturing systems.

At least some known components can be repaired and/or fabricated using a laser net shape manufacturing (LNSM) processes based on laser cladding and/or laser consolidation techniques. At least some known laser cladding systems enhance the surface properties of components locally with powdered materials melted by a laser beam. In addition, at least some known laser consolidation systems, while similar to laser cladding systems, enable a component to be fabricated through depositing multiple layers of powered material.

In at least some known laser cladding and/or consolidation systems, a laser beam generates a melt pool on a substrate, such as the component, into which powdered material is deposited. Concurrently, the substrate and the laser beam are moving relative to each other to facilitate fabricating the desired cross-sectional geometry. Consecutive layers may be additively deposited to produce a three-dimensional component. However, at least some known laser cladding and/or consolidation systems used for laser net shape manufacturing may produce varying results, such as layers with waviness and/or varying thicknesses. In addition, at least some known laser cladding and/or consolidation systems that use off-axis nozzles may have inherent clogging problems. As a result, component builds may be limited to small geometries, and/or may have frequent interruptions in the process runtime for nozzle replacement when trying to fabricate large components. Furthermore, at least some known laser cladding and/or consolidation systems have nozzle geometries that result in excessive powder stream velocity, which may lead to metallurgical defects in the cladding layers.

BRIEF DESCRIPTION

In one aspect, a nozzle assembly is provided. The nozzle assembly includes a body component defining a center axis. In addition, the nozzle assembly includes an energy beam channel defined through the body component and substantially collinear with the center axis. The energy beam channel includes an inlet portion oriented to receive an energy beam, and an outlet portion oriented to pass the energy beam therethrough. In addition, the nozzle assembly includes at least one side-feeding powder tube extending through the body component. The at least one side-feeding powder tube is oriented at an angle with respect to the center axis. Moreover, the at least one side-feeding powder tube is configured to discharge a powdered material into a focus point of the energy beam. The angle is selected to generate a powder concentration spot diameter that is about twice a beam focus point diameter of the energy beam focus point.

In another aspect, a nozzle assembly is provided. The nozzle assembly includes a body component defining a center axis. In addition, the nozzle assembly includes an energy beam channel defined through the body component and substantially collinear with the center axis. The energy beam channel includes an inlet portion oriented to receive an energy beam, and an outlet portion oriented to pass the energy beam therethrough. In addition, the nozzle assembly includes at least one side-feeding powder tube extending through the body component for discharging a powdered material into a focus point of the energy beam. The at least one side-feeding powder tube includes a length and a constant internal diameter extending along the length. The at least one side-feeding powder tube has a length to diameter (L/D) ratio within a range between approximately 40 and approximately 100. Furthermore, the nozzle assembly includes a gas-covering shroud coupled to the body component. The gas-covering shroud includes a porous end wall coupled to a lower end portion of the gas-covering shroud and adjacent to the energy beam channel outlet portion. The porous end wall is configured to pass a shielding gas therethrough and to generate a substantially homogeneous flow of shielding gas surrounding the energy beam.

In yet another aspect, a system is provided. The system includes an excitation energy source defining an optical axis, a powdered material source, a shielding gas source, and a nozzle assembly. The nozzle assembly is coupled to the excitation energy source and in communication with the powdered material source and the shielding gas source. The nozzle assembly includes a body component and an energy beam channel defined through the body component and substantially collinear with the optical axis. The energy beam channel includes an outlet portion oriented to pass an energy beam emitted by the excitation energy source therethrough. The nozzle assembly also includes at least one side-feeding powder tube extending through the body component for discharging a powdered material received from the powdered material source into a focus point of the energy beam. The at least one side-feeding powder tube is positioned at an angle with respect to the optical axis. The angle is selected to generate a powder concentration spot diameter that is about twice a beam focus point diameter of the energy beam focus point. Moreover, the nozzle assembly includes a gas-covering shroud coupled to the body component. The gas-covering shroud includes a porous end wall coupled to a lower end portion of the gas-covering shroud and adjacent to the energy beam channel outlet portion. The porous end wall is configured to pass a shielding gas received from the shielding gas source therethrough and to generate a substantially homogeneous flow of shielding gas surrounding the energy beam.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
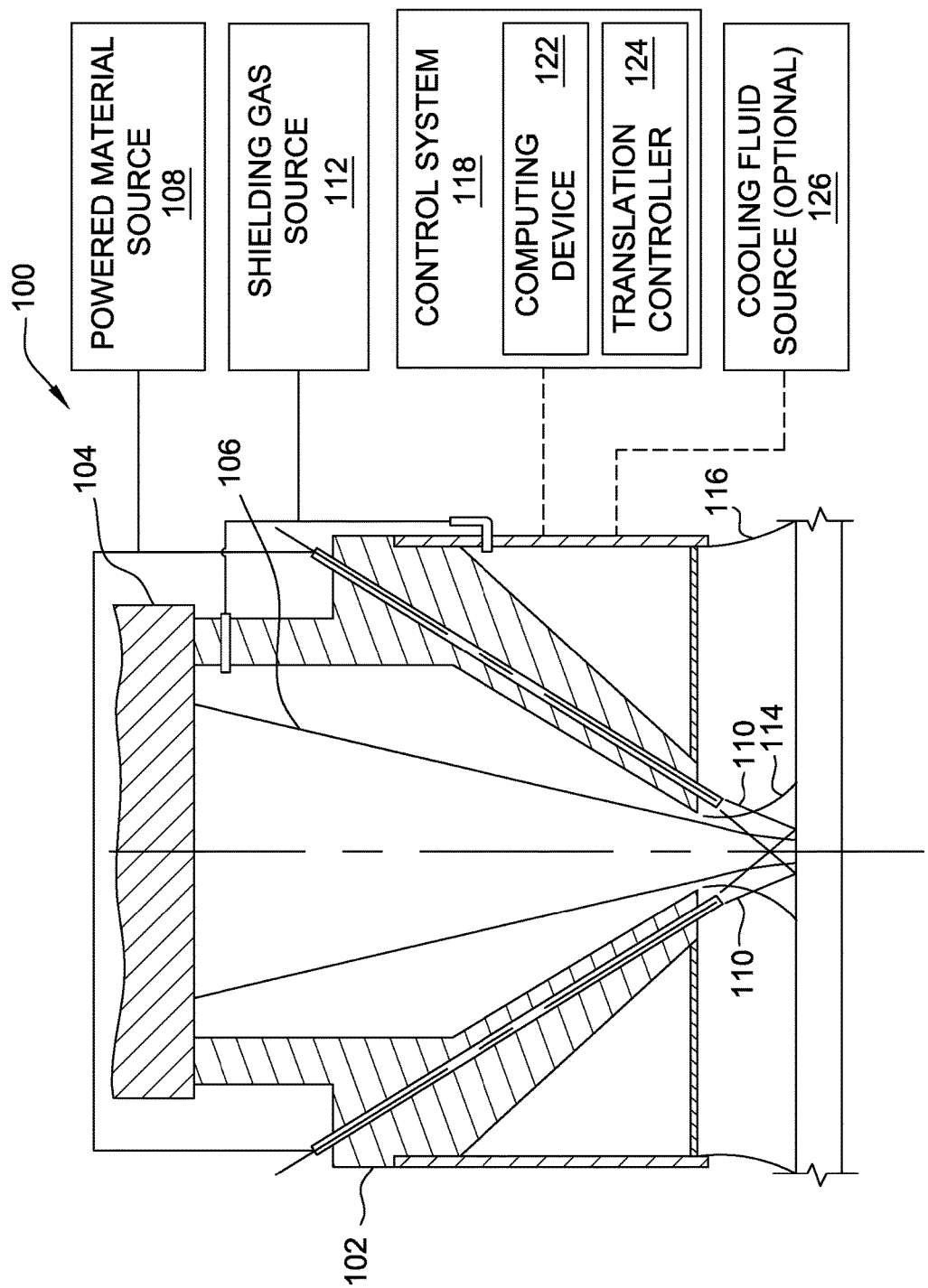
FIG. 1 is a schematic view of an exemplary net shape manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the phrase "net shape manufacturing system" includes systems that facilitate fabricating components by the buildup of a material to make a net, or near net shape component. For example, and without limitation, net shape manufacturing systems include, for example, and without limitation, laser cladding systems, laser consolidation systems, and/or other laser deposition systems.

As used herein, the terms "axial" and "axially" refer to directions and orientations that extend substantially parallel to a centerline of the net shape manufacturing system. Moreover, the terms "radial" and "radially" refer to directions and orientations that extend substantially perpendicular to the centerline of the net shape manufacturing system. In addition, as used herein, the terms "circumferential" and "circumferentially" refer to directions and orientations that extend arcuately about the centerline of the net shape manufacturing system.

As used herein, the terms "processor", "computer", and "controller", and related phrases, e.g., "processing device" and "computing device" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

FIG. 1 is a schematic view of an exemplary net shape manufacturing system 100. In the exemplary embodiment, net shape manufacturing system 100 is a laser net shape manufacturing (LNSM) system, and in particular, is a laser cladding system. LNSM provides an economical and flexible method to fabricate, repair, and/or restore components, such as airfoil components, compressor blades, and turbine components. LNSM is based on laser cladding, where a laser is used to create a 3D geometry by precisely cladding thin layers of metal powder onto a base material. While net shape manufacturing system 100 is described herein as a laser cladding system, it is noted that net shape manufacturing system 100 can be any material fusion process that enables net shape manufacturing system 100 to fabricate a component using a focused energy device and at least one powdered material. For example, and without limitation, in alternative embodiments, net shape manufacturing system 100 may be a laser consolidation system and/or other laser deposition system.

In the exemplary embodiment, net shape manufacturing system 100 includes a nozzle assembly 102, an excitation energy source 104 configured to generate an energy beam 106, a powdered material source 108 for delivering a powdered material 110 to nozzle assembly 102, a shielding gas source 112 for delivering a shielding gas, for example inert shielding gas 114 and 116, to nozzle assembly 102, and a control system 118 that controls one or more components of net shape manufacturing system 100, as described herein. In the exemplary embodiment, net shape manufacturing system 100 is configured to repair and/or fabricate components having a complex geometry that would otherwise be difficult to manufacture using traditional manufacturing techniques, such as, for example, a component 120. For example, net shape manufacturing system 100 is used for turbine blade airfoil repair, initial article manufacture from a concept design, and/or surface strengthening of an object, etc. Powdered material 110 is melted and re-solidified during the repair and/or additive manufacturing process to fabricate and/or repair component 120.

In the exemplary embodiment, excitation energy source 104 generates an energy beam 106 having sufficient energy to at least partially melt powdered material 110. In one embodiment, excitation energy source 104 is a solid state laser that emits a laser beam. In other embodiments, excitation energy source 104 includes any suitable type of energy device that enables net shape manufacturing system 100 to function as described herein, such as, for example, and without limitation, a continuous, a modulated, or a pulsed wave laser, an array of lasers, an ion-beam generator, and/or an electron beam generator. Alternatively or in addition, net shape manufacturing system 100 may include any number of excitation energy sources 104 that enable net shape manufacturing system 100 to function as described herein.

Furthermore, in the exemplary embodiment, powdered material source 108 is coupled to nozzle assembly 102 to supply nozzle assembly 102 with powdered material 110. Powdered material source 108 includes any suitable device adapted to supply nozzle assembly 102 with powdered material 110, according to the particular application. In the exemplary embodiment, powdered material 110 includes materials suitable for fabricating and/or repairing, for example, airfoil components used in gas turbine engines. For example, and without limitation, gas powdered material 110 includes atomized alloys of cobalt, iron, aluminum, titanium, nickel, and combinations thereof. In other embodiments, powdered material 110 includes any suitable type of powdered metal material. In yet other embodiments, powdered material 110 includes any suitable material that enables net shape manufacturing system 100 to function as described herein, including, for example and without limitation, ceramic powders, metal-coated ceramic powders, and thermoset or thermoplastic resins.

In addition, in the exemplary embodiment, shielding gas source 112 is coupled to nozzle assembly 102 to supply nozzle assembly 102 with inert shielding gas 114 and/or 116. Shielding gas source 112 is any suitable device adapted to supply nozzle assembly 102 with insert shielding gas 114 and/or 116, according to the particular application. Additionally, shielding gas source 112 includes any suitable insert shielding gas 114 and/or 116, including for example, and without limitation, helium gas, argon gas, etc., each of which provides various advantages based on their physical properties, such as, specific heat, density, etc.

In the exemplary embodiment, control system 118 includes a computing device 122 configured to control one or more components of net shape manufacturing system 100, for example, and without limitation, excitation energy source 104, a flow of powdered material 110 through powdered material source 108, and shielding gas source 112. Computing device 122 is a computer system that includes at least one processor (not shown) that executes executable instructions to operate net shape manufacturing system 100. Computing device 122 includes, for example, an electronic computer model or build file associated with a workpiece, such as component 120. The computer model or build file may include build parameters that are used to control one or more components of net shape manufacturing system 100. Build parameters may include, without limitation, a power of excitation energy source 104, a beam shape or profile of energy beam 106, and a position, orientation, and/or scan speed of nozzle assembly 102.

In the exemplary embodiment, translation controller 124 is coupled to nozzle assembly 102 to facilitate changing the spatial orientation between nozzle assembly 102 and component 120 or any substrate on which the laser net shape manufacturing is to occur. Translation controller 124 is any suitable movement device adapted to change the spatial orientation between nozzle assembly 102 and component 120, for example, and without limitation, a computer numerical control (CNC) device and the like. In the exemplary embodiment, computing device 122 is coupled in communication to and regulates the movement of translation controller 124.

In one embodiment, net shape manufacturing system 100 optionally includes a cooling fluid source 126. Cooling fluid source 126 can be operatively coupled to nozzle assembly 102 to supply a cooling fluid (not shown) to nozzle assembly 102. In such an embodiment, cooling fluid source 126 is any suitable device adapted to supply nozzle assembly 102 with the cooling fluid, according to the particular application. The term "cooling fluid" as is used herein generally includes liquids and gases, such as water and air.

Figure 2:
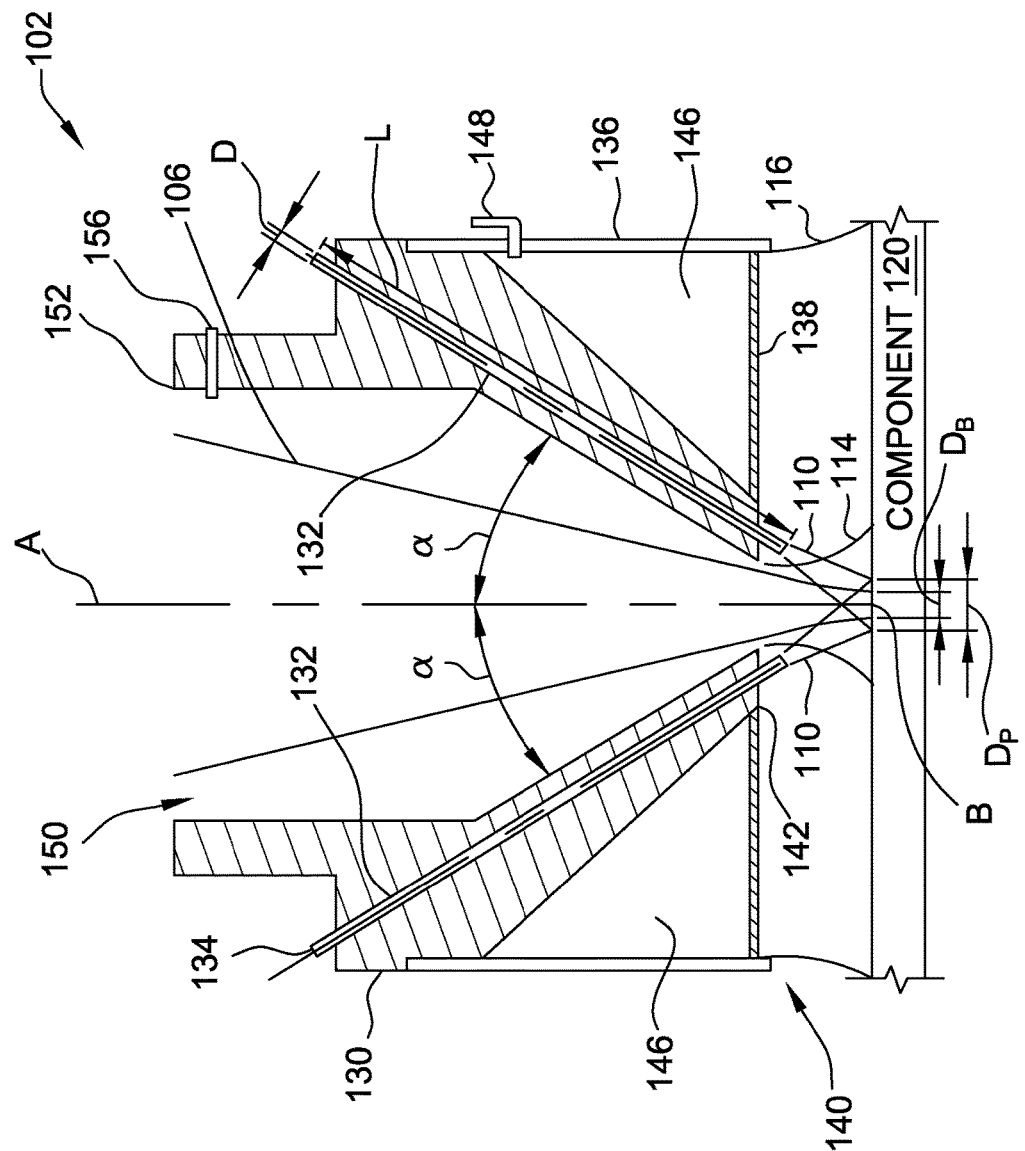
FIG. 2 is a sectional view of a nozzle assembly used with the net shape manufacturing system shown in FIG. 1.
Figure 3:
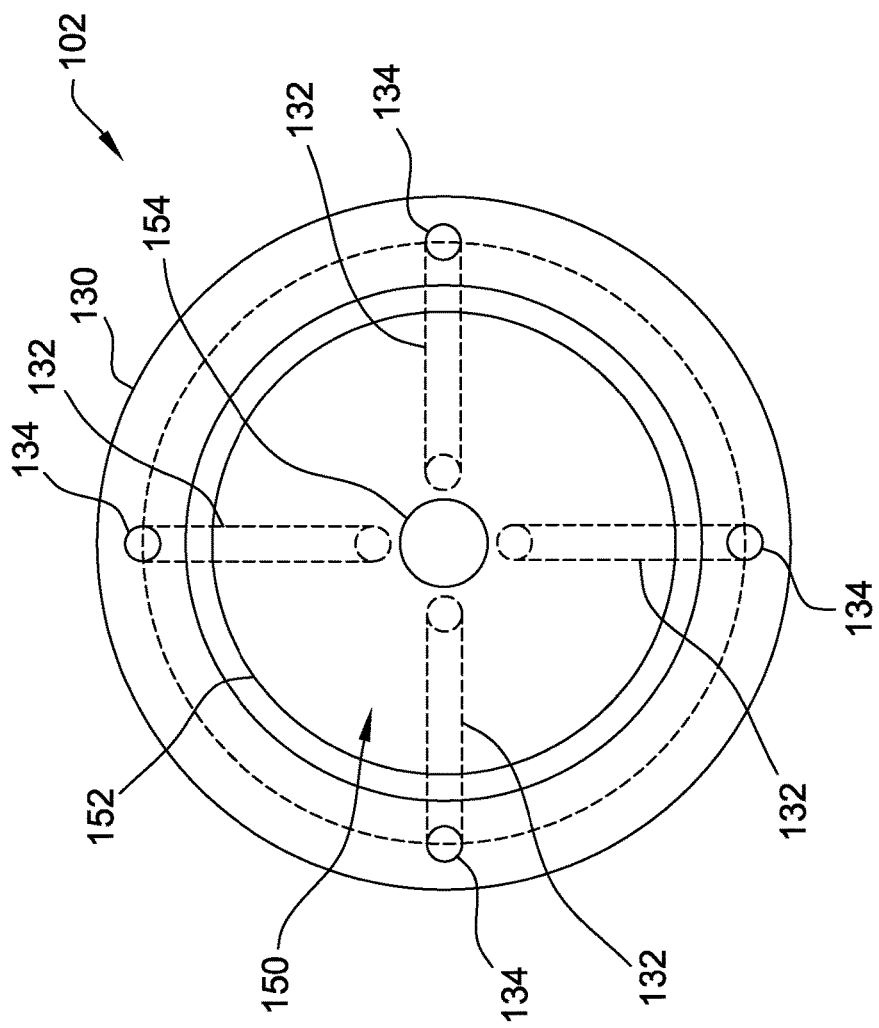
FIG. 3 is a top view of the nozzle assembly shown in FIG. 2.

FIG. 2 is a sectional view of nozzle assembly 102 of net shape manufacturing system 100 (shown in FIG. 1). FIG. 3 is a top view of nozzle assembly 102. In the exemplary embodiment, nozzle assembly 102 includes a body component 130 having one or more side-feeding powder tubes 132 extending therethrough. As used herein, the phrase "powder tube" refers to the metallic, composite, or ceramic tube section of a powder feed system that is coupled to and extends through body component 130 of nozzle assembly 102. In the exemplary embodiment, side-feeding powder tubes 132 are configured to receive powdered material 110 from powdered material source 108. In particular, side-feeding powder tubes 132 are coupled to powdered material source 108 by one or more conduits (not shown) coupled to inlets 134 of side-feeding powder tubes 132. In the exemplary embodiment, the conduits are coupled to inlets 134 using any suitable connector (not shown) configured to fasten to the conduits. For example, and without limitation, side-feeding powder tubes 132 may be connected to the conduits of powdered material source 108 using quick-connect connectors, threaded couplings, and the like.

Nozzle assembly 102 also includes a gas-covering shroud 136 coupled to body component 130 and extending axially downward, as illustrated in FIG. 2. Gas-covering shroud 136 includes a porous end wall 138 coupled to a lower end portion 140 of gas-covering shroud 136. Porous end wall 138 includes an inner aperture 142 that is coupled to body component 130. In addition, porous end wall 138 is coupled to gas-covering shroud 136 at a periphery of porous end wall 138, such that porous end wall 138 is substantially perpendicular to a center axis "A" of nozzle assembly 102. An annular plenum 146 is defined between porous end wall 138, gas-covering shroud 138, and body component 130, and is configured to receive shielding gas, for example, shielding gas 116, from shielding gas source 112 (shown in FIG. 1) by one or more gas inlets 148. In particular, gas inlets 148 are located in one or more of gas-covering shroud 138 and/or located in body component 130. Gas inlets 148 are coupled to shielding gas source 112 by one or more conduits (not shown) coupled to gas inlets 148.

In the exemplary embodiment, the conduits are coupled to gas inlets 148 using any suitable connector (not shown) configured to fasten to the conduits. For example, and without limitation, gas inlets 148 may be connected to the conduits of shielding gas source 112 using quick-connect connectors, threaded couplings, and the like. In the exemplary embodiment, shielding gas 116 is transferred from shielding gas source 112 to at least one of gas inlets 148, through annular plenum 146, and exits nozzle assembly 102 through porous end wall 138. Porous end wall 138 facilitates decreasing a flow speed of shielding gas 116 exiting nozzle assembly 102, and generating a substantially homogeneous flow of shielding gas 116 surrounding energy beam 106 between nozzle assembly 102 and component 120. Furthermore, shielding gas 116 exiting nozzle assembly 102 through porous end wall 138 facilitates preventing oxidation of a melt pool (not shown) of thermally exited powdered material 110 as well as component 120.

In the exemplary embodiment, body component 130 has an energy beam channel 150 defined therein. Energy beam channel 150 includes an inlet portion 152 configured to receive energy beam 106 from excitation energy source 104 (shown in FIG. 1). In addition, energy beam channel 150 includes an associated outlet portion 154 coupled in communication with inlet portion 152. As such, body component 130 is configured to couple to excitation energy source 104 and facilitate passing energy beam 106 therethrough. Moreover, in the exemplary embodiment, energy beam channel 150 is configured to receive shielding gas, for example, shielding gas 114, from shielding gas source 112 through one or more gas inlets 156 defined in nozzle assembly 102. In particular, gas inlets 156 are located in body component 130. Gas inlets 156 are coupled to shielding gas source 112 by one or more conduits (not shown) coupled to gas inlets 156.

In the exemplary embodiment, the conduits are coupled to gas inlets 156 using any suitable connector (not shown) configured to fasten to the conduits. For example, and without limitation, gas inlets 156 may be connected to the conduits of shielding gas source 112 using quick-connect connectors, threaded couplings, and the like. In the exemplary embodiment, shielding gas 114 is transferred from shielding gas source 112 to at least one of gas inlets 156, through energy beam channel 150, and exits nozzle assembly 102 through outlet portion 154. Shielding gas 114 exiting nozzle assembly 102 through outlet portion 154 facilitates preventing oxidation of a melt pool (not shown) of thermally exited powdered material 110 as well as component 120. In addition, shielding gas 114 exiting nozzle assembly 102 through outlet portion 154 facilitates reducing a likelihood of damage to optics (not shown) of net shape manufacturing system 100, as well as to preventing blockage of outlet portion 154 by the rebounding of heated powdered material 110.

In the exemplary embodiment, side-feeding powder tubes 132 extend through body component 130 between energy beam channel 150 and annular plenum 146 at a substantially similar angle "α" with respect to center axis "A." In the exemplary embodiment, center axis "A" corresponds to the optical axis of energy beam 106, i.e., energy beam 106 is emitted by excitation energy source 104 substantially collinear with center axis "A." Side-feeding powder tubes 132 are configured to discharge powdered material 110 into the path of energy beam 106. In particular, side-feeding powder tubes 132 are configured to discharge streams of powdered material 110 such that the streams converge at a focus point "B" of energy beam 106. Focus point "B" is a location of the melt pool (not shown) of powdered material 110 and/or the interaction point of energy beam 106 and powdered material 110. In the exemplary embodiment, nozzle assembly 102 includes four side-feeding powder tubes 132 spaced equidistant from each other within body component 130 about center axis "A." In alternative embodiments, nozzle assembly can include any number of side-feeding powder tubes 132 that enables net shape manufacturing system 100 to function as describe herein, including fewer or more than four side-feeding powder tubes 132.

In the exemplary embodiment, angle "α" with respect to center axis "A" facilitates self-leveling of the buildup of powdered material 110, thereby facilitating fabricating component 120 with a substantially flat cladding that follows the component geometry. The angle "α" of side-feeding powder tubes 132 is in the range between and including about 1° and about 75° to facilitate an optimization between self-leveling and buildup of powdered material 110. Preferably, the angle "α" of side-feeding powder tubes 132 is in the range between and including about 20° and about 30° with respect to center axis "A." In addition, as powdered material 110 is discharged from side-feeding powder tubes 132, the stream of powdered material 110 diverges. As described above, the streams of powdered material 110 converge at focus point "B" of energy beam 106. At focus point "B," angle "α" of side-feeding powder tubes 132 facilitates generating a powder concentration spot diameter "$D_P$" that is about twice a beam focus point diameter "$D_B$" of energy beam 106. As such, a ratio of powder concentration spot diameter "$D_P$" to beam focus point diameter "$D_B$" of about 2 facilitates increasing the powder capture ratio during operation of net shape manufacturing system 100.

Moreover, in the exemplary embodiment, each of side-feeding powder tubes 132 is substantially the same, having a substantially similar constant internal diameter "D" and overall length "L." A length to diameter (L/D) ratio of side-feeding powder tubes 132 facilitates discharging powdered material 110 with a decreased velocity as compared to known net shape manufacturing systems, which facilitates increasing the convergence and focus of the stream of powdered material 110. Focusing the stream of powdered material 110 facilitates increasing the powdered material 110 capture ratio. For example, if powdered material 110 is discharged too fast, an adverse buildup of powdered material 110 on component 120 can generate vortexes and disturb heat flux and the cover of inert shielding gas 114 and/or 116. In the exemplary embodiment, side-feeding powder tubes 132 have a length to diameter (L/D) ratio in the range between and including about 40 to about 100. Preferably, side-feeding powder tubes 132 have an L/D ratio in the range between and including about 50 to about 70. For example, and without limitation, in one suitable embodiment, internal diameter "D" of side-feeding powder tubes 132 is about 1 millimeter (mm) (0.04 inches (in.)) and the overall length "L" is in the range between and including about 51 mm (2.0 in.) and about 71 mm (2.8 in.). In the exemplary embodiment, the internal diameter "D" of side-feeding powder tubes 132 is in the range between and including about 0.5 mm (0.02 in.) and about 2.0 mm (0.08 in.). Preferably, the internal diameter "D" of side-feeding powder tubes 132 is in the range between and including about 0.9 mm (0.035 in.) and about 1.3 mm (0.05 in.).

In the exemplary embodiment, side-feeding powder tubes 132 are fabricated from a high thermal conductivity material, for example, and without limitation, electrical grade copper, copper alloys, brass, aluminum alloys, or metal-ceramic composite, to facilitate rapid heat extraction away from powdered material 110 flowing through side-feeding powder tubes 132. In operation, the use of high thermal conductivity materials facilitates alleviating issues that arise from clogging and melting of side-feeding powder tubes 132 due to back reflection of energy beam 106. Back reflection of energy beam 106 is caused by energy reflected off of component 120 from energy beam 106. In addition, high thermal conductivity materials facilitate increasing the operating life of side-feeding powder tubes 132, which also facilitates enabling an increased length of time of runtime when fabricating a component, such as component 120. In the exemplary embodiment, a high thermal conductivity material has a thermal conductivity greater than about 90 watts per meter kelvin (W/m-K). Preferably, side-feeding powder tubes 132 are fabricated from a material has a thermal conductivity greater than about 200 W/m-K, such as, and without limitation, copper.

In the exemplary embodiment, copper is used to fabricate side-feeding powder tubes 132 due to its high thermal conductivity, which is typically above 300 W/m-K. In addition, copper has a reflectivity at room temperature of about 95%, thereby enabling side-feeding powder tubes 132 to reduce the electromagnetic radiation absorption from the reflected energy beam 106 and the electromagnetic radiation emissions from the melt pool (not shown). However, generally, as metals increase in heat, the reflectivity of the material decreases. For example, the reflectivity of copper decreases as side-feeding powder tubes 132 increase in heat, thereby increasing the amount of energy of energy beam 106 absorbed by side-feeding powder tubes 132 and accelerating the thermal load accumulation in the material. In some embodiments, to facilitate reducing the energy absorption of side-feeding powder tubes 132, the side-feeding powder tubes 132 may be polished to a highly lustrous surface finish having high reflectivity. Side-feeding powder tubes 132 may be polished using any known polishing technique that enables side-feeding powder tubes 132 to function as described herein. For example, and without limitation, side-feeding powder tubes 132 may be mechanically polished and electro-polished. Polishing side-feeding powder tubes 132 facilitates reducing the energy absorption of side-feeding powder tubes 132 during operation of net shape manufacturing system 100, thereby increasing the operational life of side-feeding powder tubes 132 and increasing the operation time of net shape manufacturing system 100. An increase in the service life of side-feeding powder tubes 132 results in a reduced operating cost of net shape manufacturing system 100, thereby reducing the manufacturing cost of workpieces, such as component 120, produced by net shape manufacturing system 100.

Alternatively, or in addition, in some embodiments, side-feeding powder tubes 132 include a reflective coating layer (not shown) coupled thereto by an adhering method or a plating method. For example, and without limitation, the reflective coating layer may be a reflective sheet with a silver or gold color, a thin film with a silver or gold color, or a mirrored film adhered to side-feeding powder tubes 132. Alternatively, in another embodiment, the reflective coating layer may be deposited on side-feeding powder tubes 132 using any plating technology that enables side-feeding powder tubes 132 to function as described herein. For example, and without limitation, side-feeding powder tubes 132 may be plated with a reflective material, e.g., silver, gold, chrome, or nickel, using for example, electroplating or electroless plating.

In one embodiment, and as described above, net shape manufacturing system 100 optionally includes cooling fluid source 126 coupled to nozzle assembly 102 to supply a cooling fluid (not shown) to nozzle assembly 102. As described herein, as side-feeding powder tubes 132 increase in heat, the reflectivity of the material used to fabricate side-feeding powder tubes 132 decreases. Accordingly, an increased amount of energy from energy beam 106 may be absorbed into side-feeding powder tubes 132, accelerating the heat accumulation if the side-feeding powder tubes 132 are not being actively cooled. As shown in FIG. 1, net shape manufacturing system 100 optionally includes cooling fluid source 126. Nozzle assembly 102 is coupled to cooling fluid source 126 by one or more conduits (not shown) to supply the cooling fluid to nozzle assembly 102. In such an embodiment, nozzle assembly 102, and in particular body component 130, may include one or more fluid routing channels (not shown) configured to channel the cooling fluid through nozzle assembly 102. The cooling fluid and the fluid routing channels are configured to facilitate actively nozzle assembly 102, and in particular side-feeding powder tubes 132 and body component 130. The fluid routing channels may extend through nozzle assembly 102 along any desirable route, and may include, for example, without limitation, linear portions, curved portions, serpentine portions, or any combination thereof. In such an embodiment, cooling fluid source 126 facilitates increasing the operational life of side-feeding powder tubes 132 and increasing the operation time of net shape manufacturing system 100. As such, an increase in the service life of side-feeding powder tubes 132 results in a reduced operating cost of net shape manufacturing system 100, thereby reducing the manufacturing cost of the workpieces, such as component 120, produced by net shape manufacturing system 100.

In operation, powdered material source 108 supplies powdered material 110 to nozzle assembly 102 for deposition upon a workpiece, such as component 120. Excitation energy source 104 emits energy beam 106 and melts powdered material 110 as it is deposited upon component 120 and also melts a portion of component 120 to create a melt pool in the area where energy beam 106 is directed on powdered material 110 and component 120. Nozzle assembly 102 and component 120 are moved relative to each other to facilitate forming a layer of a solidified, deposited powdered material 110 as the melt pool cools. In particular, control system 118 controls the relative movement of nozzle assembly 102 and component 120 using computing device 122 and translation controller 124. For example, control system 118 directs energy beam 106 and nozzle assembly 102 along a predetermined path on component 120, i.e., a toolpath. The deposited powdered material 110 forms a bead of material along the toolpath as the melt pool cools. Upon completion of a first bead of powdered material 110, nozzle assembly 102 and energy beam 106 are positioned and moved relative to component 120 so that an adjacent second bead of powdered material 110 may be deposited adjacent the first bead of powdered material 110. The process is repeated until a layer of the deposited powdered material 110 is formed. In addition, the entire layer forming process may be repeated upon a previous layer to build up layers of deposited powdered material 110 until component 120 is formed and/or repaired.

Exemplary embodiments of systems and methods for fabricating and/or repairing a component using laser net shape manufacturing (LNSM) are described above in detail. The embodiments provide a powdered material distribution nozzle assembly that provides advantages over known LNSM systems in that the nozzle includes one or more side-feeding powder tubes configured to balance powder capture ratio, focusability, and melt pool integrity. The side-feeding powder tubes are fabricated from a high thermal conductivity material and include geometry optimized to facilitate increasing the powder capture ratio, while facilitating auto leveling of the material buildup to facilitate achieving substantially flat cladding layers that strictly follow the component geometry. The side-feeding powder tubes include a length to diameter ratio configured to facilitate emitting the powdered material stream with enough velocity to converge with other powder stream and remain focusable, which facilitates increasing the powdered material capture ratio. Furthermore, the side-feeding powder tubes are positioned at angles with respect to the optical axis of the laser beam to facilitate generating a powder spot diameter that is about twice the laser beam diameter. The use of a high thermal conductivity material facilitates alleviating issues that arise from clogging and melting of side-feeding powder tubes due to back reflection of the laser beam. As such, the net shape manufacturing system and methods described herein facilitates increasing the operational life of the nozzle assembly and increasing the operation time of the net shape manufacturing system. An increase in the service life of the nozzle assembly results in a reduced operating cost of the net shape manufacturing system, thereby reducing the manufacturing cost of workpieces produced by the net shape manufacturing system.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. For example, components of each system and/or steps of each method may be used and/or practiced independently and separately from other components and/or steps described herein. Additionally, while various embodiments of the disclosure have been described, it is to be understood that aspects of the disclosure may include only some of the described embodiments, and that each component and/or step may also be used and/or practiced with other systems and methods. Accordingly, the disclosure is not to be seen as limited by the foregoing description, but is only limited by the scope of the appended claims.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nozzle assembly comprising:
   a body component defining a center axis;
   an energy beam channel defined through said body component and substantially collinear with the center axis, said energy beam channel comprising an inlet portion oriented to receive an energy beam, and an outlet portion oriented to pass the energy beam therethrough; and
   at least one side-feeding powder tube extending through said body component, said at least one side-feeding powder tube oriented at an angle with respect to the center axis, wherein said at least one side-feeding powder tube is configured to discharge a powdered material into a focus point of the energy beam, and wherein said angle is selected to generate a powder concentration spot diameter that is about twice a beam focus point diameter of the energy beam focus point.

2. The nozzle assembly in accordance with claim 1, wherein said angle is within a range between approximately 1° and approximately 75° with respect to the center axis.

3. The nozzle assembly in accordance with claim 2, wherein said angle is within a range between approximately 20° and approximately 30° with respect to the center axis.

4. The nozzle assembly in accordance with claim 1, wherein said at least one side-feeding powder tube is fabricated from a thermally conductive material that has a thermal conductivity greater than approximately 90 watts per meter kelvin (W/m-K).

5. The nozzle assembly in accordance with claim 1, wherein said at least one side-feeding powder tube is fabricated from a thermally conductive material that has a thermal conductivity greater than approximately 200 watts per meter kelvin (W/m-K).

6. The nozzle assembly in accordance with claim 1, wherein said at least one side-feeding powder tube is fabricated from one of an electrical grade copper, a copper alloy, brass, an aluminum alloy, or a metal-ceramic composite material.

7. The nozzle assembly in accordance with claim 1, wherein said at least one side-feeding powder tube comprises a plurality of side-feeding powder tubes spaced equidistant from each other within said body component about the center axis.

8. A nozzle assembly comprising:
   a body component defining a center axis;
   an energy beam channel defined through said body component and substantially collinear with the center axis, said energy beam channel comprising an inlet portion oriented to receive an energy beam, and an outlet portion oriented to pass the energy beam therethrough;
   at least one side-feeding powder tube extending through said body component for discharging a powdered material into a focus point of the energy beam, said at least one side-feeding powder tube comprising a length and a constant internal diameter extending along said length, said at least one side-feeding powder tube comprising a length to diameter (L/D) ratio within a range between approximately 40 and approximately 100; and a gas-covering shroud coupled to said body component, said gas-covering shroud comprising a porous end wall coupled to a lower end portion of said gas-covering shroud adjacent said energy beam channel outlet portion, said porous end wall configured to pass a shielding gas therethrough and generate a substantially homogeneous flow of the shielding gas surrounding the energy beam.

9. The nozzle assembly in accordance with claim 8, wherein said L/D ratio is within a range between approximately 50 and approximately 70.

10. The nozzle assembly in accordance with claim 8, wherein said constant internal diameter is within a range between approximately 0.5 millimeters (mm) (0.02 inches (in.)) and approximately 2.0 mm (0.08 in.).

11. The nozzle assembly in accordance with claim 8, wherein said at least one side-feeding powder tube is fabricated from a thermally conductive material that has a thermal conductivity greater than approximately 90 watts per meter kelvin (W/m-K).

12. The nozzle assembly in accordance with claim 11, wherein said at least one side-feeding powder tube is fabricated from a thermally conductive material that has a thermal conductivity greater than approximately 200 watts per meter kelvin (W/m-K).

13. The nozzle assembly in accordance with claim 8, wherein said at least one side-feeding powder tube comprises a plurality of side-feeding powder tubes spaced equidistant from each other within said body component about the center axis.

14. The nozzle assembly in accordance with claim 8, wherein said at least one side-feeding powder tube is oriented at an angle with respect to the center axis, said angle within a range between approximately 20° and approximately 30° with respect to the center axis.

15. A system comprising:
an excitation energy source defining an optical axis;
a powdered material source;
a shielding gas source; and
a nozzle assembly coupled to said excitation energy source and in communication with said powdered material source and said shielding gas source, said nozzle assembly comprising:
a body component;
an energy beam channel defined through said body component and substantially collinear with the optical axis, said energy beam channel comprising an outlet portion oriented to pass an energy beam emitted by said excitation energy source therethrough;
at least one side-feeding powder tube extending through said body component for discharging a powdered material received from said powdered material source into a focus point of the energy beam, said at least one side-feeding powder tube oriented at an angle with respect to the optical axis, wherein said angle is selected to generate a powder concentration spot diameter that is about twice a beam focus point diameter of the energy beam focus point; and
a gas-covering shroud coupled to said body component, said gas-covering shroud comprising a porous end wall coupled to a lower end portion of said gas-covering shroud and adjacent to said energy beam channel outlet portion, said porous end wall configured to pass a shielding gas received from said shielding gas source therethrough and to generate a substantially homogeneous flow of shielding gas surrounding the energy beam.

16. The system in accordance with claim 15, wherein said at least one side-feeding powder tube further comprises a length and a constant internal diameter extending along said length, said at least one side-feeding powder tube comprising a length to diameter (L/D) ratio within a range between approximately 40 and approximately 100.

17. The system in accordance with claim 16, wherein said constant internal diameter is within a range between approximately 0.5 millimeters (mm) (0.02 inches (in.)) and approximately 2.0 mm (0.08 in.).

18. The system in accordance with claim 15, wherein said angle is within a range between approximately 1° and approximately 75° with respect to the optical axis.

19. The system in accordance with claim 15, wherein said at least one side-feeding powder tube is fabricated from a thermally conductive material that has a thermal conductivity greater than approximately 90 watts per meter kelvin (W/m-K).

20. The system in accordance with claim 15, wherein said at least one side-feeding powder tube comprises a plurality of side-feeding powder tubes spaced equidistant from each other within said body component about the center axis.

* * * * *

UNITED STATES PATENT AND TRADEMARK OFFICE
CERTIFICATE OF CORRECTION

| | |
|---|---|
| PATENT NO. | : 10,457,035 B2 |
| APPLICATION NO. | : 15/451872 |
| DATED | : October 29, 2019 |
| INVENTOR(S) | : Kemal Mehmet Coskun et al. |

It is certified that error appears in the above-identified patent and that said Letters Patent is hereby corrected as shown below:

In the Specification

Column 8, Line 5, delete "angle "a"" and insert therefor -- angle "$\alpha$" --.

Signed and Sealed this
Fourth Day of July, 2023

Katherine Kelly Vidal
*Director of the United States Patent and Trademark Office*